Patented Oct. 19, 1937

2,095,955

UNITED STATES PATENT OFFICE 2,095,955

REACTION PRODUCT AND METHOD OF PRODUCING THE SAME

Harry Bennett, Brooklyn, and Felix Braude, Bronx, N. Y.; said Braude assignor to said Bennett No Drawing. Application May 31, 1935, Serial No. 24,354

3 Claims. (Cl. 252—6)

The invention relates to novel synthetic emulsifiable products, and particularly to products of the same general type as those described in a prior Patent #1,914,100, granted the 13th day of June, 1933. In that patent there are disclosed reaction products, comprising substantially a dihydric alcohol completely esterified with a higher fatty acid having a carbon content greater than 5, together with an excess of the fatty acid.

We have found that trihydric and higher polyhydric alcohols such as glycerol, polyglycerols, pentaerythritol, sorbitol, their ethers, etc., may also be utilized to afford such products which, particularly at elevated temperatures and in the presence of water, retain the desirable acid reacting property and, do not become alkaline in reaction. In many instances such temporary alkalinity may not be objectionable; but when the product is used, for example, in connection with certain dye baths sensitive to alkalis or in medicinal processes involving treatment of bacteria sensitive to alkalis, etc., this temporary presence of an alkaline emulsion may be particularly objectionable, notwithstanding that such emulsion may return to the acid reaction upon cooling.

We have found, also, that a more effective control of the acidity may be had if a mixture of buffer salts be utilized in the preparation of the emulsifiable product when using either a dihydric or a higher polyhydric alcohol.

The present invention, therefore, has for an object the provision of a synthetic emulsifiable material of the nature hereinbefore set forth, and derived from a trihydric or higher polyhydric alcohol, wherein any free alkali is buffered to such an extent that the product, when emulsified, will retain its acid reaction irrespective of the temperature to which it is subjected and will not hydrolyze at the higher temperature and give an alkaline reaction.

A further object of the invention resides in the novel method of preparing an emulsifiable product with a mixture of buffer salts possessing neutral or acid properties and functioning also as a catalyst in the esterification of the polyhydric alcohol.

The novel product, as in the case of the previously patented product, is self-emulsifying, namely does not require any emulsifying agent to effect its dispersion in water and other solvents. It retains in addition superior solubility properties, being capable of dissolving in turpentine to the extent of 15% and in alcohol to the extent of 5%. Moreover, it is characterized by a low pH value.

In carrying out the process for the production of the novel product, a trihydric or a higher member of the polyhydric alcohols, or their ethers, is esterified by heating the same with an acid of the higher members of the fatty acid series containing more than 5 carbon atoms to the molecule, such as stearic acid, myristic, lauric, linoleic, oleic acids, etc., together with buffer salts acting as a catalyst. These salts may comprise mixtures of acid phosphates, mixtures of borates and boric acid and mixtures of acid phthalates in varying proportions of the ingredients such that the pH of the resultant product is below 7.0 and contains no alkali nor gives an alkaline reaction even in boiling of the same in the presence of water. The amount of catalyst required may be varied within wide limits in accordance with the characteristics desired for the reaction products. Substitution products of these acids are also suitable, such as Turkey red oil or other sulphonated oils, fats, waxes or other fatty acid esters.

The amounts or proportions of the alcohol and acid employed in carrying out the reaction may be varied throughout a considerable range and will depend in each case upon the nature of the product to be produced and the alcohols and acids used. In general, also, the reaction is carried out in such a way that free acid is present in the final product.

The following typical examples have been found to give satisfactory products:

47.5 parts glycerine, 56.8 parts stearic acid, .42 part monosodium acid phosphate, and 1.25 parts disodium acid phosphate by weight are heated together with stirring to 145° C. for 3 hours. The excess glycerine may be distilled off under vacuum; or, alternatively upon cooling, the glycerine monostearate crystallizes out leaving a lower layer, weighing 28.5 parts, which is largely unreacted glycerine and which may be mechanically separated from the crystals. The glycerine stearate thus obtained amounts to 66.5 parts by weight and contains 31.7% unreacted stearic acid.

35.6 parts glycerine, 42.6 parts oleic acid, .31 part monosodium acid phosphate, and .93 part disodium acid phosphate by weight are heated together with stirring to 145° C. for 3 hours. The excess glycerine may be distilled under vacuum or upon cooling two oily layers separate. The upper layer thus obtained amounts to 53.5 parts by weight. It is largely glycerine mono oleate and contains 23% free oleic acid. The lower layer contains 9% free fatty acid but is largely glycerine. It may be added to subsequent batches.

The use of an excess of the alcohol (glycerine) results in a product of a lower percentage of the free fatty acid. However, molecular proportions of the glycerine may be utilized and in which case it is unnecessary to effect separation of alcohol.

In the case of a polyhydric alcohol, or a derivative thereof, lower than glycerine, a mixture of buffer salts such as mono- and disodium phosphates has been found effective not only in affording buffer properties in the reaction product but also in catalyzing the esterification. Thus, 42.5 parts by weight of diethylene glycol, 113 parts of stearic acid, and 3 parts of mixed phosphate salts as a catalyst and consisting of 1 part by weight of monosodium acid phosphate and 3 parts of disodium acid phosphate are utilized, the glycol and stearic acid being heated with stirring to a temperature of 100° C. Thereupon, the mixed phosphates in an approximately 35% aqueous solution thereof and heated to a temperature of 100° C., are added to the glycol-stearic acid mixture, the combined solutions being heated to 135° C. and maintained at this temperature for a period of at least 3 hours.

Moreover, the amount of excess stearic or other acid in the novel reaction product may be reduced provided a catalyst is used which always remains neutral or acid regardless of the temperature of reaction and when the finished product is dispersed in water at any temperature.

These reactions result in the production of homogeneous white products either of a waxy or of a viscous nature and whose free fatty acid content varies from 45 to 50%. A dispersion of 3 parts by weight of this product in 90 parts by weight of water affords a heavy, smooth cream which is extremely viscous.

In concentrations of aqueous dispersions of this product of from 5% to 50%, the pH value varies from 6.2 to 6.9, respectively; and elevated temperatures do not appear to affect the effective pH of the dispersion. Its use, such as in skin and cosmetic preparations and with materials as fabrics where delicate colors are concerned, and which would be objectionably affected by alkaline reactions, is therefore especially valuable. Moreover, it provides for a neutralizing effect where slight alkaline conditions prevail.

In its preparation, slight changes of temperature affect the viscosity of the dispersion, its degree of esterification, and the whiteness of the product obtained in the minimum time, and the minimum amount of catalyst required.

The reaction mass may be then dissolved in benzol or naphtha and filtered, the solvent being thereafter distilled from the filtrate and the latter run onto chilled rolls from which the glycol or glycerol stearate thus obtained is scraped off in waxy flakes or chips. This compound or product is odorless, colorless and tasteless, and non-corrosive, non-toxic and edible. It is furthermore, soluble in alcohol benzol, turpentine, etc., and affords with water or diluted alcohol a voluminous, gelatinous precipitate or dispersion.

We claim:

1. An aqueous emulsion of water and a reaction compound consisting essentially of an ester of a polyhydric alcohol and a higher fatty acid having a carbon content greater than 5, with an excess of the fatty acid, and a buffer consisting of one mixture from the group consisting of soluble borates and boric acid; monosodium and disodium phosphates, the buffer maintaining said emulsion acid or neutral at temperatures up to 100° C.

2. As an emulsifying agent, the reaction compound consisting essentially of an ester of a polyhydric alcohol and a higher fatty acid having a carbon content greater than 5, with an excess of the fatty acid, and a buffer consisting of one mixture from the group consisting of soluble borates and boric acid; monosodium and disodium phosphates, the buffer maintaining said compound acid or neutral in the presence of water at temperatures up to 100° C.

3. As an emulsifying agent, the reaction compound consisting essentially of an ester of a polyhydric alcohol esterified at a temperature of between 135° C. and 145° C. with a higher fatty acid having a carbon content greater than 5, with an excess of the fatty acid, and less than 3% by weight of a buffer consisting of one mixture from the group consisting of soluble borates and boric acid; monosodium and disodium phosphates, the buffer maintaining said compound acid or neutral in the presence of water at temperatures up to 100° C.

HARRY BENNETT.
FELIX BRAUDE.